United States Patent [19]

Baker

[11] Patent Number: 4,921,207
[45] Date of Patent: May 1, 1990

[54] ACTUATED GATE VALVE WITH MANUAL OVERRIDE

[75] Inventor: Gerald S. Baker, Houston, Tex.

[73] Assignee: Cameron Iron Works USA, Inc., Houston, Tex.

[21] Appl. No.: 397,011

[22] Filed: Aug. 22, 1989

[51] Int. Cl.⁵ .............................. F16K 31/143
[52] U.S. Cl. ............................ 251/14; 74/25;
    74/57; 74/89; 74/625; 192/71; 251/229;
    251/252; 251/63.5; 251/63.6; 251/58
[58] Field of Search ............ 74/424.8 VA, 625, 25,
    74/57, 89; 192/41 A, 43.1, 71; 251/14, 229, 252,
    63.5, 63.6, 326, 327, 328, 329, 58

[56] References Cited

U.S. PATENT DOCUMENTS

| | | | |
|---|---|---|---|
| 2,705,609 | 4/1955 | Prescott | 251/162 |
| 2,885,172 | 5/1959 | Natho | 251/14 |
| 3,417,960 | 12/1968 | Stehlin | 251/14 |
| 3,492,880 | 2/1970 | Pearson | 251/58 |
| 4,189,950 | 2/1980 | Killian | 74/424.8 VA |
| 4,194,718 | 3/1980 | Baker et al. | 74/625 |
| 4,213,480 | 7/1980 | Orum et al. | 251/14 |
| 4,616,803 | 10/1986 | Schils | 251/14 |
| 4,650,151 | 3/1987 | McIntyre | 251/14 |
| 4,791,856 | 12/1988 | Heim et al. | 251/63.6 |

FOREIGN PATENT DOCUMENTS 229886  10/1968  U.S.S.R. .............. 192/43.1

Primary Examiner—George L. Walton

[57] ABSTRACT

An improved gate valve having a body with a gate positioned therein to reciprocate between positions opening and closing flow through the body, a pressure responsive actuator connected to move the gate stem, a manual override stem and an overriding drive connection connecting both the actuator and the manual override stem to the gate stem so that the gate stem and gate are moved by both the actuator and by the manual override stem independently of the actuator. A modified form of the invention is provided for directly connecting to an extension of an actuator stem for operating a valve manually. In another modified form, camming element and a camming extension are provided to increase the forces providing release of the paddles from within a groove on the interior of the housing so that the locking action of the paddles do not prevent proper operation of the mechanism.

11 Claims, 17 Drawing Sheets

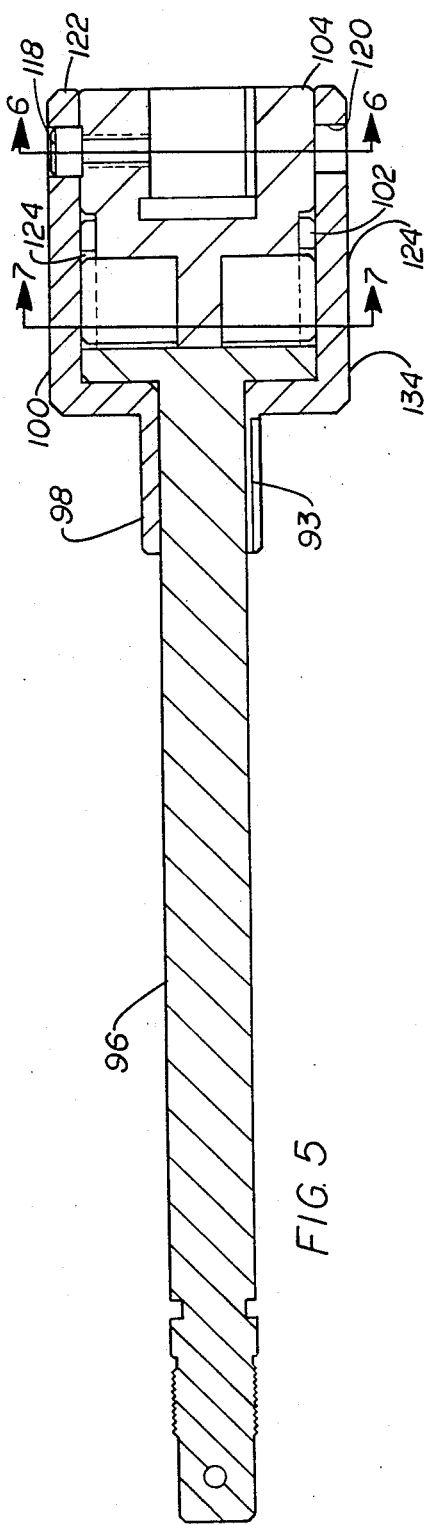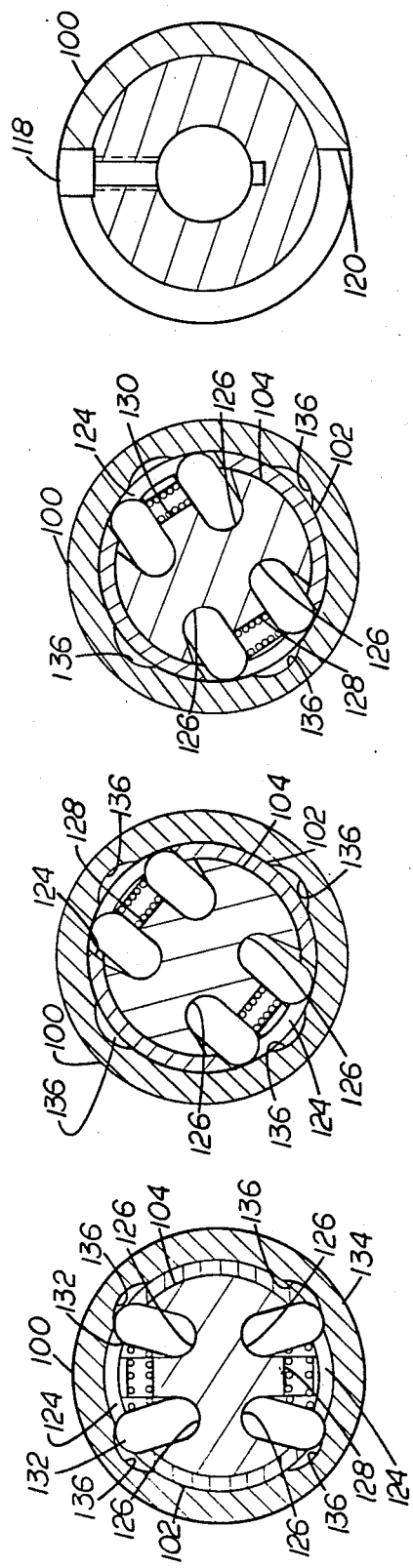

ACTUATED GATE VALVE WITH MANUAL OVERRIDE

CROSS REFERENCE TO RELATED APPLICATIONS

This application is a continuation-in-part of my prior copending application Ser. No. 07/313,708, filed Feb. 22, 1989 now abandoned.

BACKGROUND

The present invention relates to an improved fluid actuated gate valve with a manual override.

Prior to the present invention there have been gate valves of the type contemplated herein which included a fluid actuator and a valve member which moved axially responsive to the movement of a pressure responsive piston which causes the rotation of a stem and the stem rotation is translated into the axial movement of the gate. Such valves are often used in high pressure applications (e.g., 10,000 psi operating pressure) and in small sizes (e.g., one-half inch size). Since such pressure responsive actuators may have a pressure fluid trapped therein when it is desired to manually move the gate they have not been movable without bleeding the operator chambers.

U.S. Pat. No. 4,189,950 discloses a manual override apparatus to be used as a valve actuator which includes a threaded stem extending through the manual override housing and a pair of nut halves which are connected to a crank mechanism through a camming system which causes the nuts to move into engagement with the threaded stem when the crank handle is rotated.

Overrunning clutches are well known and include a plurality of sprags or paddles which are positioned between two cylindrical surfaces and when they are rotating in one direction with respect to each other both are freewheeling and when the reverse direction is used by the driving surface the paddles provide the engagement with the driven surface to cause rotation thereof.

SUMMARY

The improved valve of the present invention is a gate valve and includes a rotating stem and cam and pin arrangement for movement of the gate, the actuator is a piston type having a camming connection between the piston and the actuator stem so that the axial movement of the piston rotates the actuator stem and this rotation is transmitted through an improved overrunning drive or clutch type connection to rotate the gate stem to move the gate. The improved override includes an override stem which can be manually rotated and which extends through the actuator and the actuator stem into the improved overrunning drive or clutch type connection. Manual rotation of the override stem causes rotation of the gate stem and movement of the gate but does not require rotation of the actuator stem as it is bypassed in the operation of the override mechanism. A modified form of the present invention provides the improved manual overriding mechanism which connects directly to the actuator stem of a valve without the necessity of having a mechanical connection extending through the actuator to the valve stem. An object of the present invention is to provide an improved manual override mechanism for a valve which can be used independent of the condition of the pressure responsive actuator of the valve.

A further object is to provide an improved manual valve override mechanism and an improved connection between the override mechanism and the valve stem and between the actuator stem and the valve stem which allows transmission of rotation of the valve stem responsive to override stem rotation without rotating the actuator stem.

Still another object is to provide an improved manual override mechanism for a gate valve with an improved clutch connection between the manual override stem and the actuator stem so that the actuator does not deter or limit the operation of the manual override mechanism.

Another object is to provide an improved high pressure gate valve with a manual override which is simple and easy to operate and functions independent of the valve actuator.

BRIEF DESCRIPTION OF THE DRAWINGS

These and other objects and advantages of the present invention are hereinafter set forth and explained with reference to the drawings wherein:

FIG. 5 is a partial sectional view of the improved manual override mechanism of the present invention.

FIG. 6 is a transverse sectional view taken along line 6—6 in FIG. 5 to illustrate the mechanical lost motion connection between the actuator stem and the gate stem.

FIG. 7 is a transverse sectional view taken along line 7—7 in FIG. 5 and showing the drive connections between the gate stem and both of the actuator stem and the manual override stem in position for the rotation of the gate stem by the actuator stem.

FIG. 8 is a transverse sectional view similar to FIG. 7 but illustrating the rotation of the manual override stem and gate stem in the clockwise directions.

FIG. 9 is a similar transverse sectional view to FIG. 8 but illustrating the rotation of the manual override stem and gate stem in the counterclockwise directions.

DESCRIPTION OF THE PREFERRED EMBODIMENT

Figure 1:
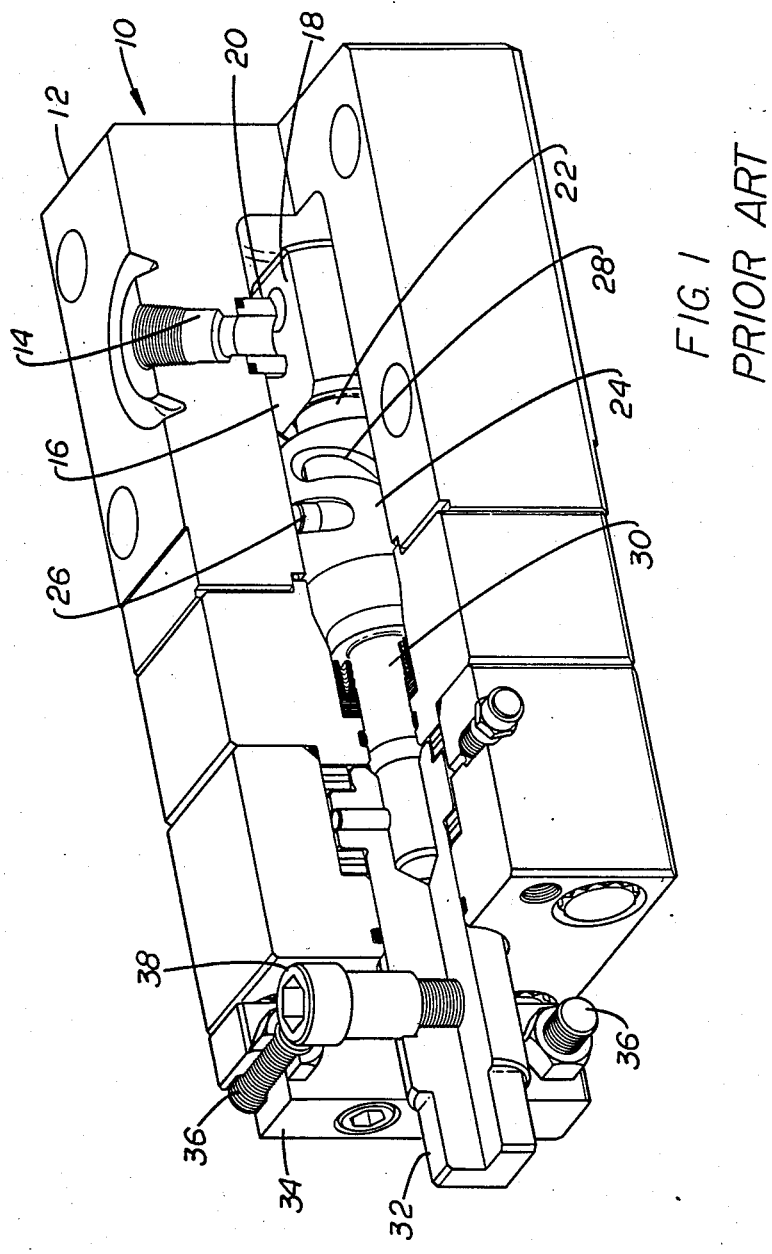
FIG. 1 is an isometric view of a high pressure gate valve of the prior art which requires only one-half rotation of the stem to move the gate between its opposite positions.
Figure 2:
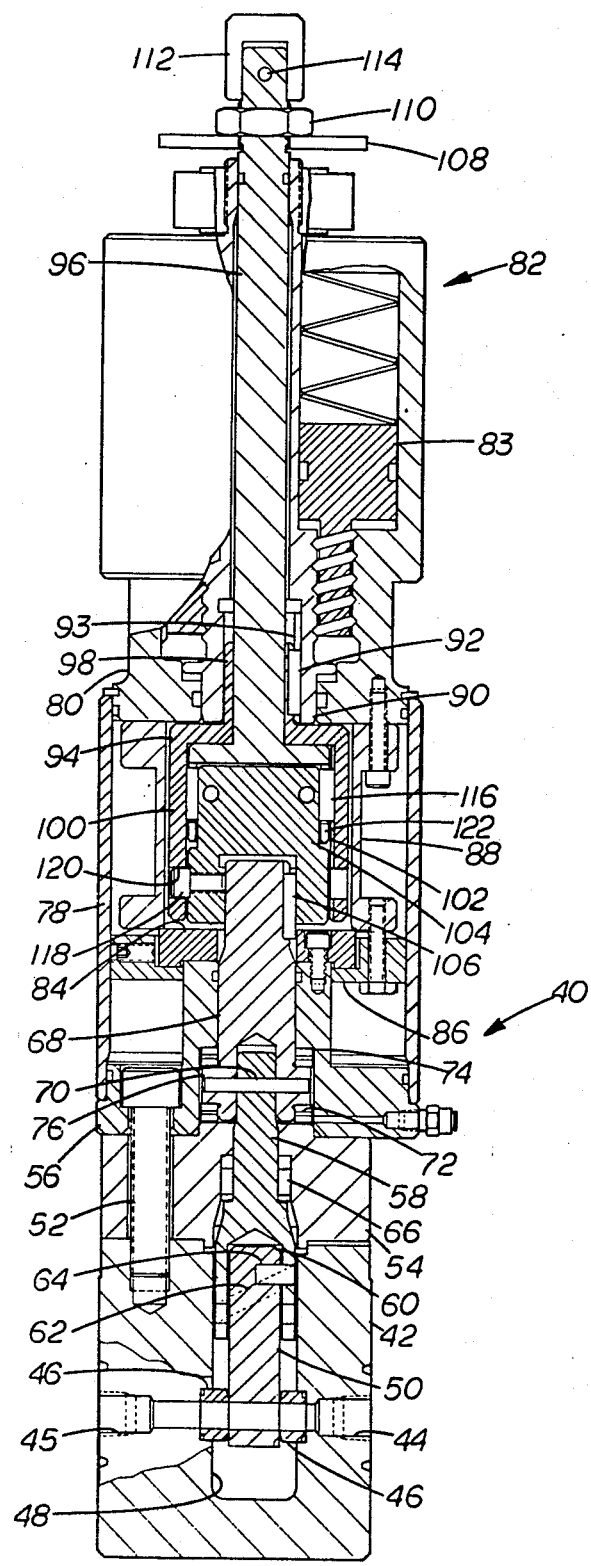
FIG. 2 is a sectional view of the improved valve of the present invention showing the gate in its open position.
Figure 3:
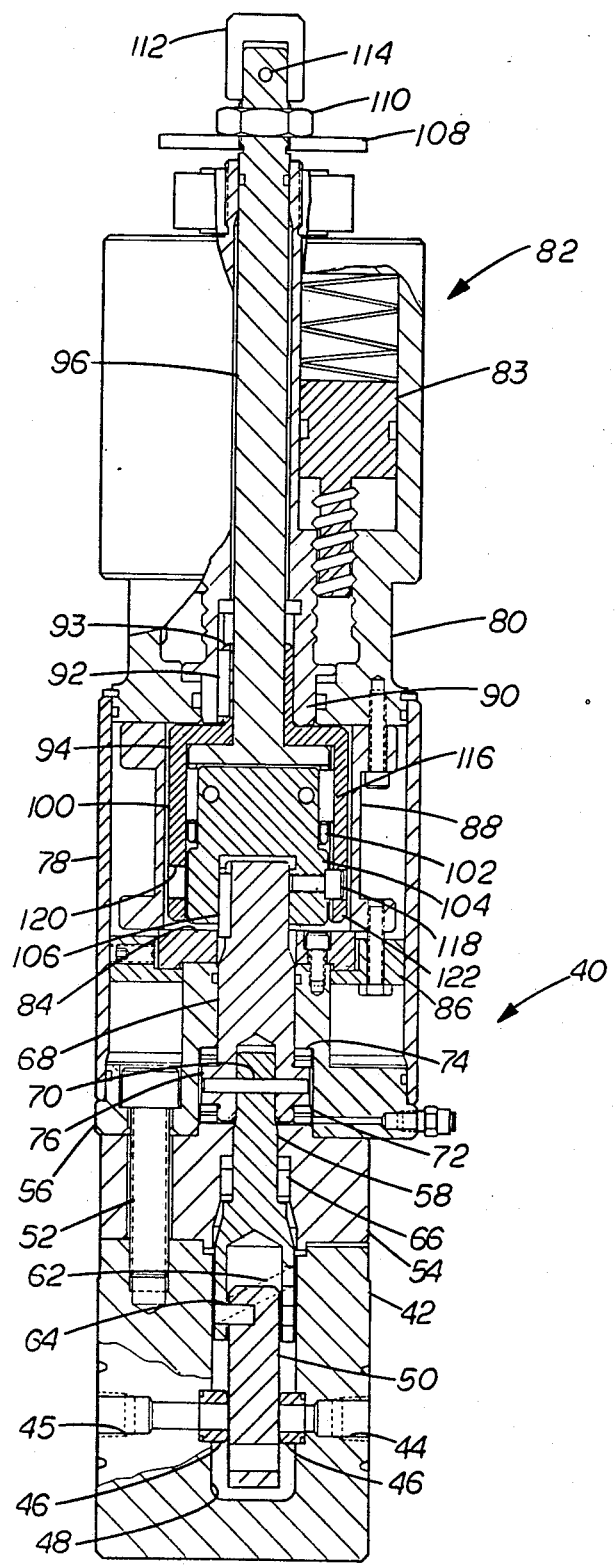
FIG. 3 is a sectional view of the improved valve shown in FIG. 2 but showing the gate in its closed position after it has been moved by its actuator.
Figure 4:
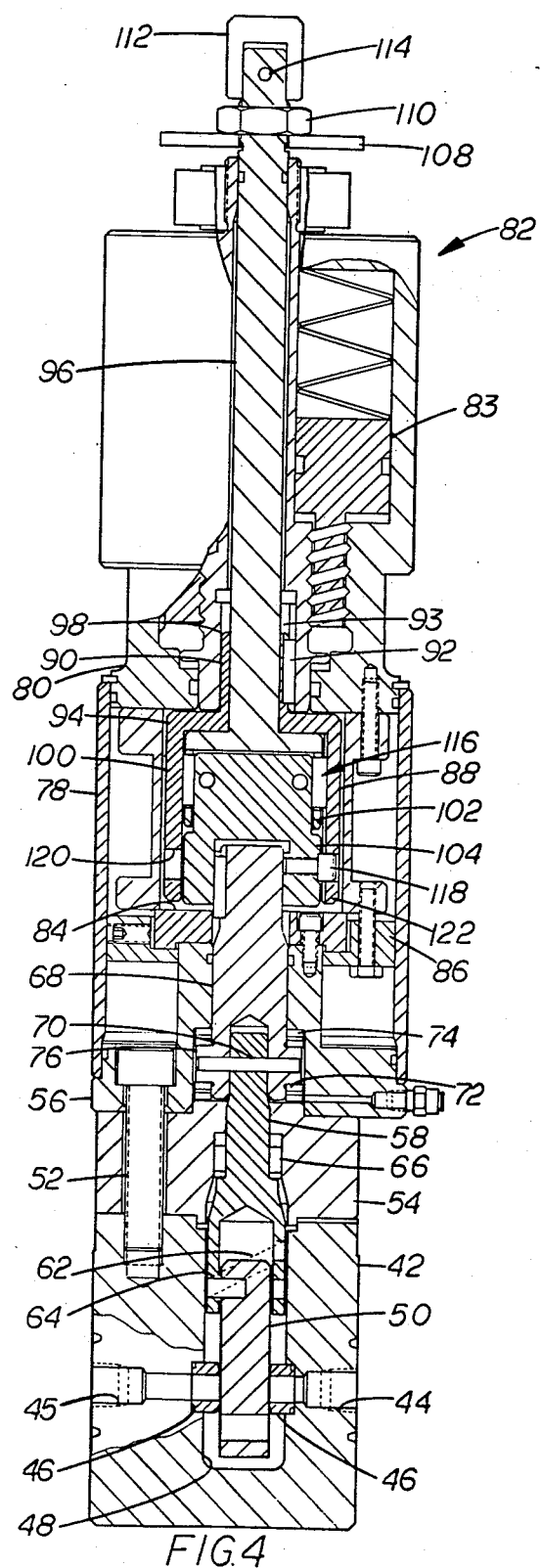
FIG. 4 is a similar sectional view of the same valve showing the gate in its closed position after it has been moved by its manual override mechanism.

Prior art valve 10 shown in FIG. 1 is a small, high pressure, manually operated valve which is used in subsea applications. Valve 10 includes body 12 having inlet 14 extending therein and an outlet (not shown) opposite inlet 14 with both communicating with chamber 16 in which gate 18 is positioned. Suitable bushings 20 are positioned within chamber 16 to seal around the openings of inlet 14 and outlet therein and to also seal against the sides of gate 18. Gate stem 22 extends upwardly from gate 18 and into operating sleeve 24 which receives pin 26 in helical slot 28. Pin 26 is secured in gate stem 22. Operating stem 30 extends from sleeve 24 and connects to manual stem 32 that extends to the exterior of body 12. Block 34 is secured to the end of body 12 near the point of exit of manual stem 32 therefrom and provides stops 36 which are engaged by stop screw 38 which is secured into manual stem 32 as shown. The outer end of manual stem 32 is formed in a square shape to receive a crank or handwheel for manual rotation. It should be noted that the maximum amount of rotation of manual stem 32 needed for the full travel of gate 18 is only a half of a full rotation or 180 degrees. Valve 40 is the improved valve of the present invention and includes body 42 having inlet 44 and outlet 45 with bushings 46 positioned and sealing between the inner opening of inlet 44 within chamber 48 and the surface of gate 50. Cap screws 52 secure bonnet 54 and bearing plate 56 to body 42.

Gate stem 58 surrounds the upper end 60 of gate 50 which is cylindrical in shape and includes helical slot 62 in gate stem 58 which receives pin 64 secured in gate 50 and rides therein so that rotation of gate stem 58 causes gate 50 to reciprocate within chamber 48 between positions blocking and allowing flow between inlet 44 and the outlet. Suitable seal 66 is provided between the exterior of gate stem 58 and the interior of bonnet 54.

Stem adapter 68 is connected in position around the outer end of gate stem 58 and extends through and is rotatable in bearing plate 56. Pin 70 secures stem adapter 68 to gate stem 58. Bearings 72 and 74 are positioned around stem adapter 68 at each side of its flange 76 as shown. Outer housing sleeve 78 surrounds bearing plate 56 and is in engagement with actuator housing 80 of actuator 82. Inner head 84 surrounds stem adapter 68 and is secured to the end of bearing plate 56 and outer head 86 surrounds inner head 84 and is secured to spacer sleeve 88 which is secured to actuator housing 80 as shown, all by suitable cap screws.

Actuator 82 is a pressure responsive actuator having a piston 83 or other mechanism to translate pressure differential into axial motion and a suitable connection is provide to the mechanism which provides the axial motion to rotate actuator stem 90. Key 92 is positioned in adjacent slots 93 in actuator stem 90 and actuator stem guide 94.

Manual override stem 96 extends through the center of actuator 82 and into the center of actuator stem guide 94. Sleeve portion 98 of actuator stem guide 94 includes the slot in which key 92 is received, surrounds the exterior of manual override stem 96 and extends from cup shaped portion 100 of actuator stem guide 94. Cup shaped portion 102 of override stem 96 is positioned within cup portion of stem guide 94 and actuator stem adapter 104 is positioned within both cup shaped portions 100 and 102. Key 106 is positioned in slots in actuator stem adapter 104 and in the exterior of stem adapter 68. Indicator plate 108 is secured around manual override stem 96 and is held in place by jam nut 110. Stem drive cap 112 is secured to the end of manual override stem 96 by pin 114.

Connecting drive means 116 connects between actuator stem adapter 104 and actuator stem guide 94 and manual override stem 96 provides an improved driving connection so that either the actuator 82 or the manual override stem 96 can be the source of power for the movement of gate 50. Such connecting drive means 116 includes cup portions 100 and 102 and actuator stem adapter 104. Cap screw 118 is secured in actuator stem adapter 104 and extends radially outward therefrom into straight slot 120 in cup portion 100 of actuator stem guide 94. Slot 10 extends approximately one-half around cup portion 100 as shown in FIG. 5 so that there is a lost motion connection in this connection but after approximately one-half turn the drive connection is direct. Skirt 122 of cup portion 102 includes slots 124 which are best seen in FIGS. 6, 7 and 8. Actuator stem adapter 104 includes four radial grooves 126 which are rounded at their inner surface and widen gradually as shown. Openings 128 are provided between each pair of grooves 126 and springs 130 are positioned therein. Paddles 132 have rounded outer ends and rounded inner ends which are positioned in grooves 126. The interior of skirt 134 of cup portion 100 includes arcuate recesses 136 in positions spaced to be positioned with respect to the outer end of paddles 132 as shown. Springs 130 engage the facing surfaces of each pair of paddles 132 and urge them apart for the reasons as hereinafter explained.

Figure 10:
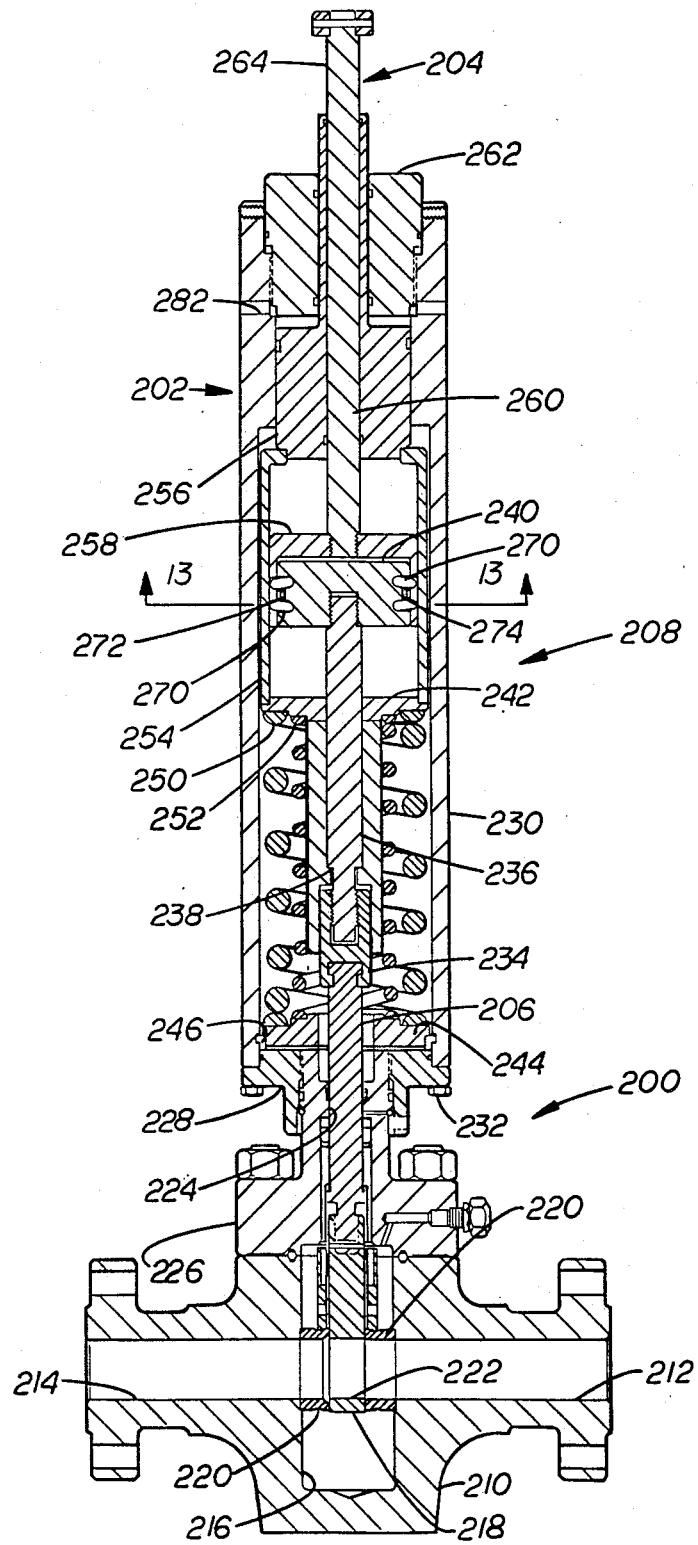
FIG. 10 is a sectional view of a modified form of the present invention showing the valve in open position.
Figure 11:
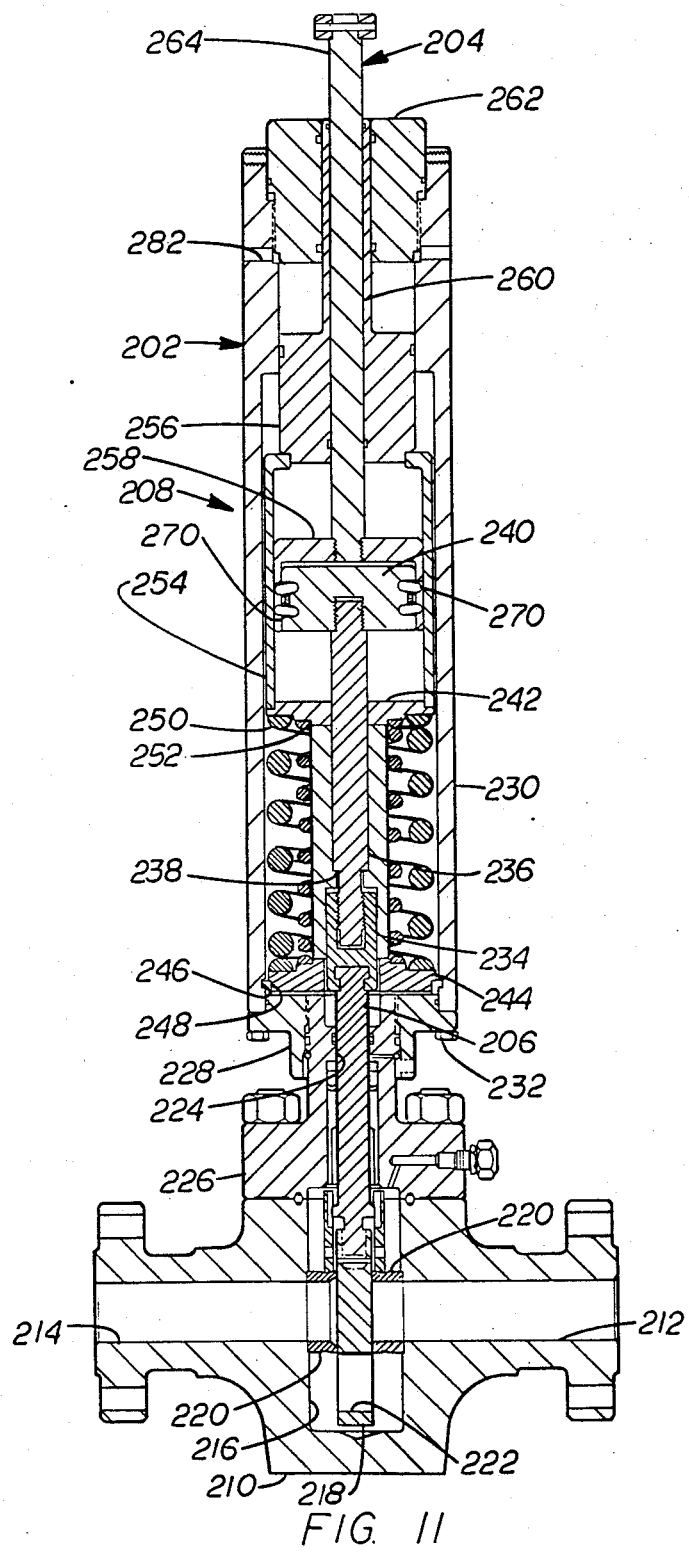
FIG. 11 is another sectional view of the modified valve and actuator shown in FIG. 10 but showing the valve in closed position after having been closed by its actuator.
Figure 12:
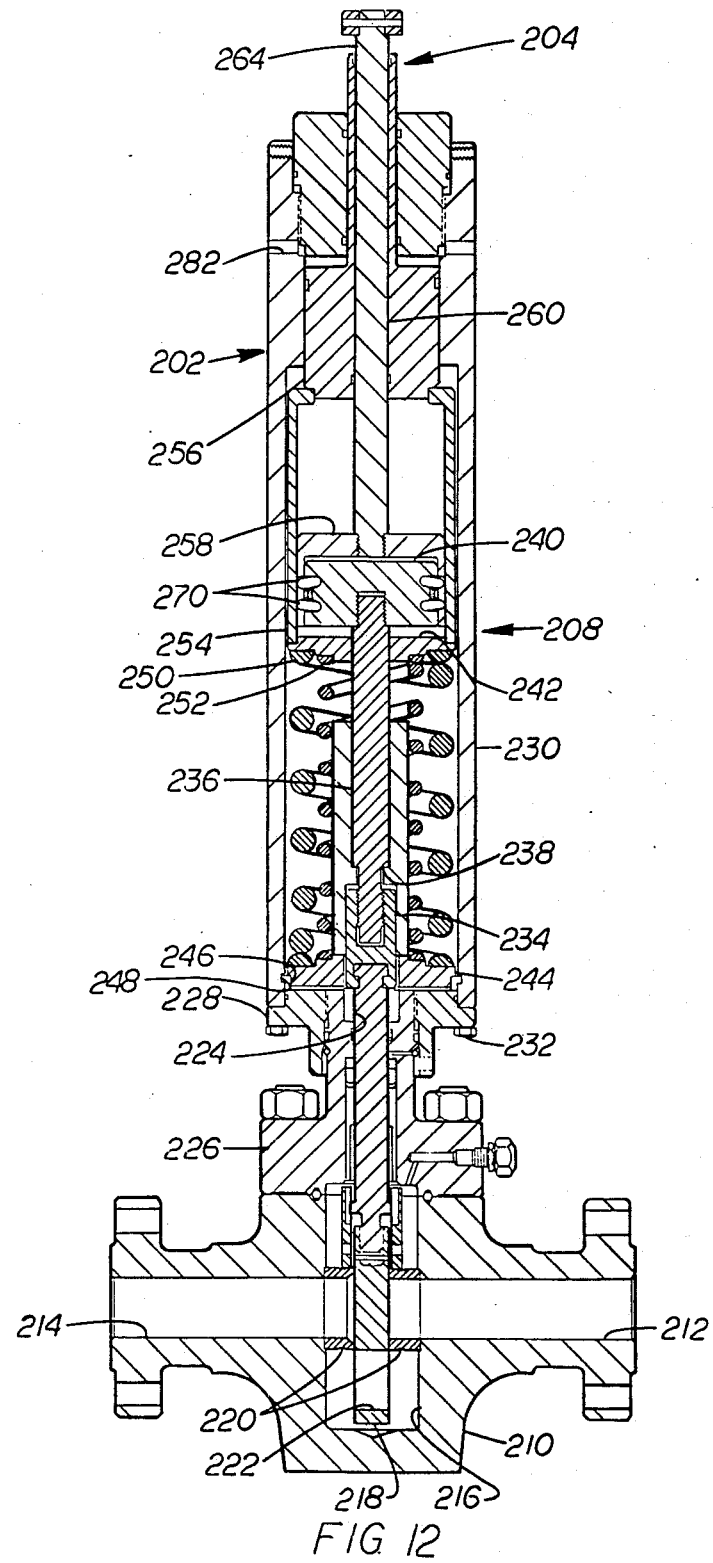
FIG. 12 is another sectional view of the modified valve shown in FIGS. 10 and 11 but showing the valve in closed position after having been closed by its manual override.

Valve 200 as shown in FIGS. 10 through 12 is a modified valve which does not have the rotary actuation as shown with respect to valve 40 above but rather includes direct longitudinal actuation by the actuator 202 and longitudinal actuation by the override mechanism 204, both of which are interconnected to the gate stem 206 through connecting drive means 208 which allows operation of the override mechanism 204 independent of the actuator 202 as hereinafter set forth.

Valve 200 includes body 210 having inlet 212 and outlet 214 communicating with gate chamber 216 in which gate 218 is positioned. Bushings 220 are positioned surrounding the openings of inlet 212 and outlet 214 into chamber 216 and provide a passageway therethrough and further seal against the sides of gate 218. Passage 222 through gate 218 is adapted to provide communication between inlet 212 and outlet 214 when it is in registry with the passageways through bushings 220 and to close communication between inlet 212 and outlet 214 when passage 222 is not in registry with the passageways through bushings 220. The open position of gate 218 is shown in FIG. 10 and FIGS. 11 and 12 illustrate the closed position of gate 218. Gate stem 206 is secured to the upper end of gate 218 and extends in sliding relationship through bore 224 in bonnet 226 which is secured to body 210 in position around the opening of gate chamber 216 in body 210.

Flange 228 is secured around the upper end of bonnet 226 and has tubular housing 230 secured thereto by cap screws 232 and extends upwardly therefrom. Connecting adapter 234 is secured to the upper end of gate stem 206 and connects to drive stem 236. Drive stem 236 includes downwardly facing shoulder 238 and extends upwardly into engagement with drive adapter 240. Upper spring ring 242 surrounds drive stem 236 below drive adapter 240. Lower spring ring 244 is supported on snap ring 246 which is positioned in groove 248 in the lower interior of tubular housing 230. Springs 250 and 252 are mounted between spring rings 242 and 244 to exert an upward or returning force on drive sleeve 254 which engages between upper spring ring 242 and piston 256 of actuator 202 in surrounding relationship to override drive cup 258 and drive adapter 240 as shown. Override stem 260 is secured to override drive cup 258 and extends outwardly through piston 256 and through plug 262 which is secured within the upper end of tubular housing 230 so that its outer end 264 is accessible on the exterior of housing 230.

Figure 13:
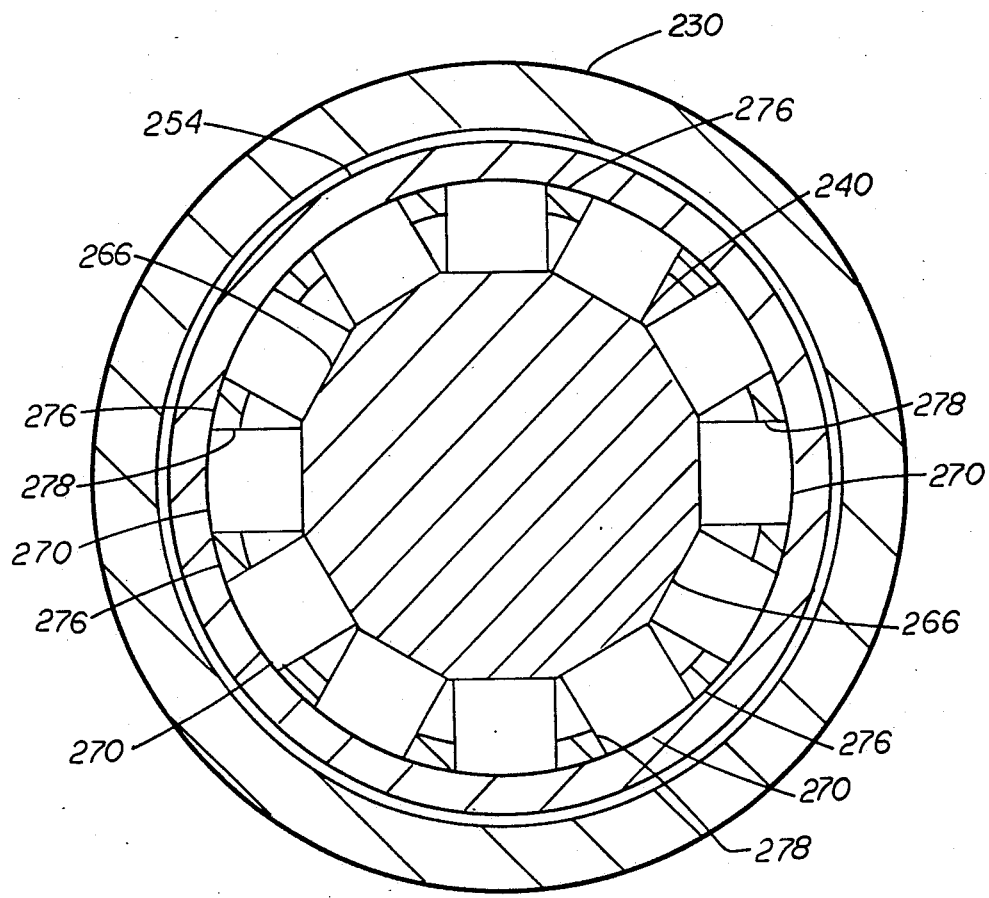
FIG. 13 is a transverse sectional view of the drive or clutch mechanism for the manual override mechanism taken along line 13—13 in FIG. 10.
Figure 14:
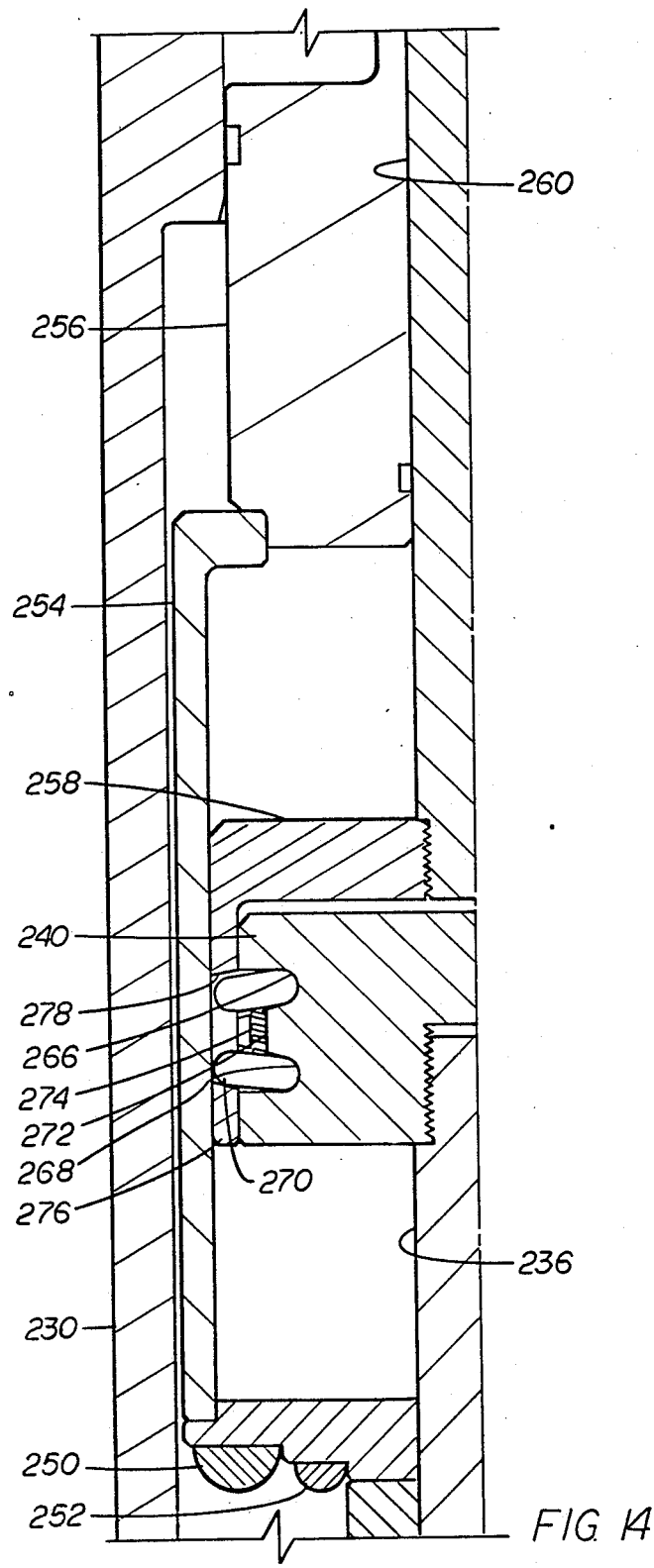
FIG. 14 is a detail partial axial sectional view of the drive mechanism for the manual override mechanism.

Connecting drive means 208 includes first series of grooves 266 around the exterior of drive adapter 240 and second series of grooves 268 around the exterior of drive adapter 240 as shown. The inner ends of grooves 266 and 268 are rounded to receive drive paddles 270. A plurality of ports 272 extend through drive adapter 240 in communication with grooves 266 and 268 to receive springs 274 which urge paddles 270 in a direction away from each other. Each of grooves widen outwardly as shown so that paddles 270 are free to pivot to a degree as hereinafter described. Skirt 276 of override drive cup 258 includes a series of slots 278 extending around skirt 276. Slots 278 are positioned to receive paddles 270 extending therethrough as illustrated in detail in FIGS. 13 and 14.

In operation, pressure fluid is supplied through port 282 to be exerted on the upper end of piston 256 to cause it to move downwardly. This moves drive sleeve 254 downwardly and the dragging engagement of the lower series of paddles 270 which have their outer rounded ends in engagement with the interior of drive sleeve 254, are pivoted slightly so that their outer ends move into tighter engagement and cause drive adapter 240 to move downwardly with the movement of piston 256 and drive sleeve 254. The upper series of paddles 270 tend to pivot in the opposite direction thus releasing their outer ends from tight engagement with the interior of drive sleeve 254. The direct connection of drive adapter 240 through drive stem 236 and adapter 234 causes gate stem 206 and gate 218 to move with it and gate 218 is moved to its closed position as shown in FIG. 11.

When pressure is relieved from port 282, piston 256 is moved upwardly responsive to the force exerted by springs 250 and 252 on upper spring ring 242 which is transmitted through drive sleeve 254 to piston 256. This upward movement of drive sleeve 254 causes the upper series of paddles 270 to pivot into tighter engagement with the interior of drive sleeve 254 thus, ensuring the movement of drive adapter 240 and gate 218 with the movement of drive sleeve 254. The lower series of paddles 270 are pivoted so that their engagement with the interior of drive sleeve 254 is lightened.

When an overriding of the movement of actuator 202 is desired, override stem 260 can be moved manually to move gate 218 totally independent of the position of actuator piston 256 and the force exerted thereon by springs 250 and 252. Assuming that gate 218 is in the open position shown in FIG. 10 and it is to be closed manually with override mechanism 204, override stem 260 is moved downwardly to cause override drive cup 258 to move downwardly within drive sleeve 254 and with respect to drive adapter 240. The portion of skirt 276 at the upper end of slots 278 engages the upper row of paddles 270 causing them to pivot downwardly at their outer ends out of engagement with the interior of drive sleeve 254. Lower series of paddles 270 remain in light engagement with the interior of drive sleeve 254 by virtue of the force exerted by springs 274 but such engagement does not create any appreciable drag resisting the movement of drive adapter 240 and gate 218 in 25 the downward direction. Any tightening of the engagement of the outer ends of paddles 270 with the interior of drive sleeve 254 causes paddles to pivot about their inner ends in an upwardly direction moving them out of driving engagement with the interior of drive sleeve 254. The manual override mechanism 204 can also be used in cause the gate 218 to move from its lower position to its upper position independently of the position of actuator 202. This movement is achieved by manually raising override stem 260 which causes the portion of skirt 276 of drive cup 258 at the lower end of slots 278 to engage the lower series of paddles 270 to pivot them upwardly around their inner ends and thus move them out of engagement with the interior of drive sleeve 254. The upper series of paddles 270 remain in light contact with the interior of drive sleeve 254 but any tightening of their engagement causes them to pivot about their inner ends in a downwardly direction moving them out of driving engagement with the interior of drive sleeve 254.

From the foregoing it can be seen that the present invention provides an improved valve in which a mechanical override mechanism may be provided to cause a desired movement of the valve member totally independent of the position of its actuator and the forces exerted by the actuator. The present is suitably applicable for use with valves which require a rotary movement to cause the movement of the valve member and with valves which require an axial movement to cause the movement of the valve member.

Figure 15:
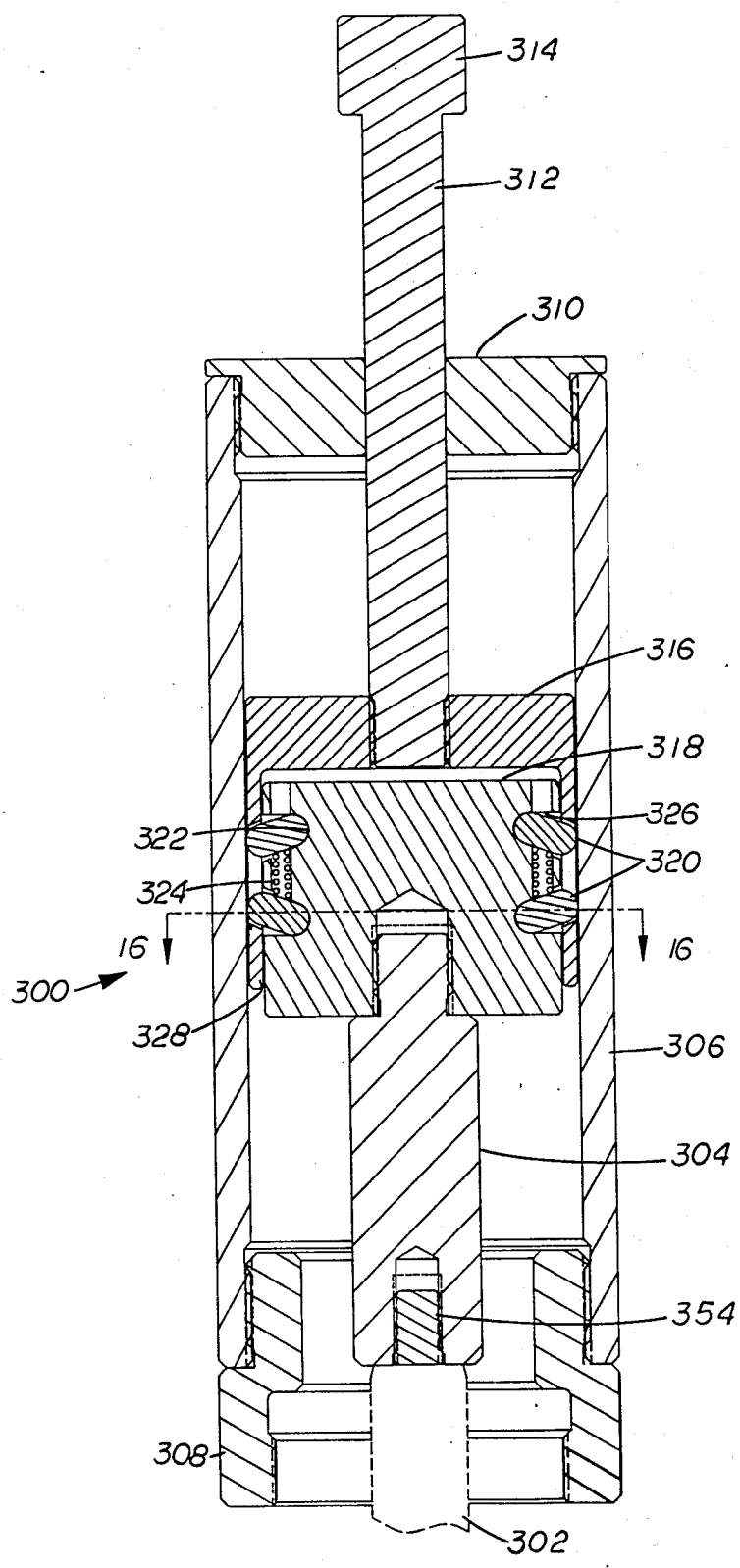
FIG. 15 is a longitudinal sectional view of a modified form of manual override mechanism of the present invention which can be directly attached to the valve stem of a valve.
Figure 16:
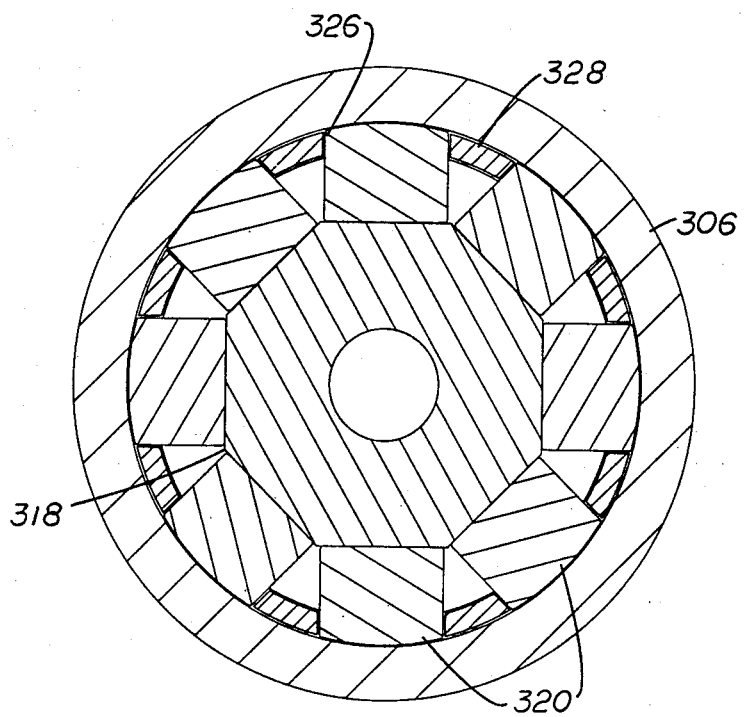
FIG. 16 is a transverse sectional view taken along line 16—16 in FIG. 15.
Figure 17:
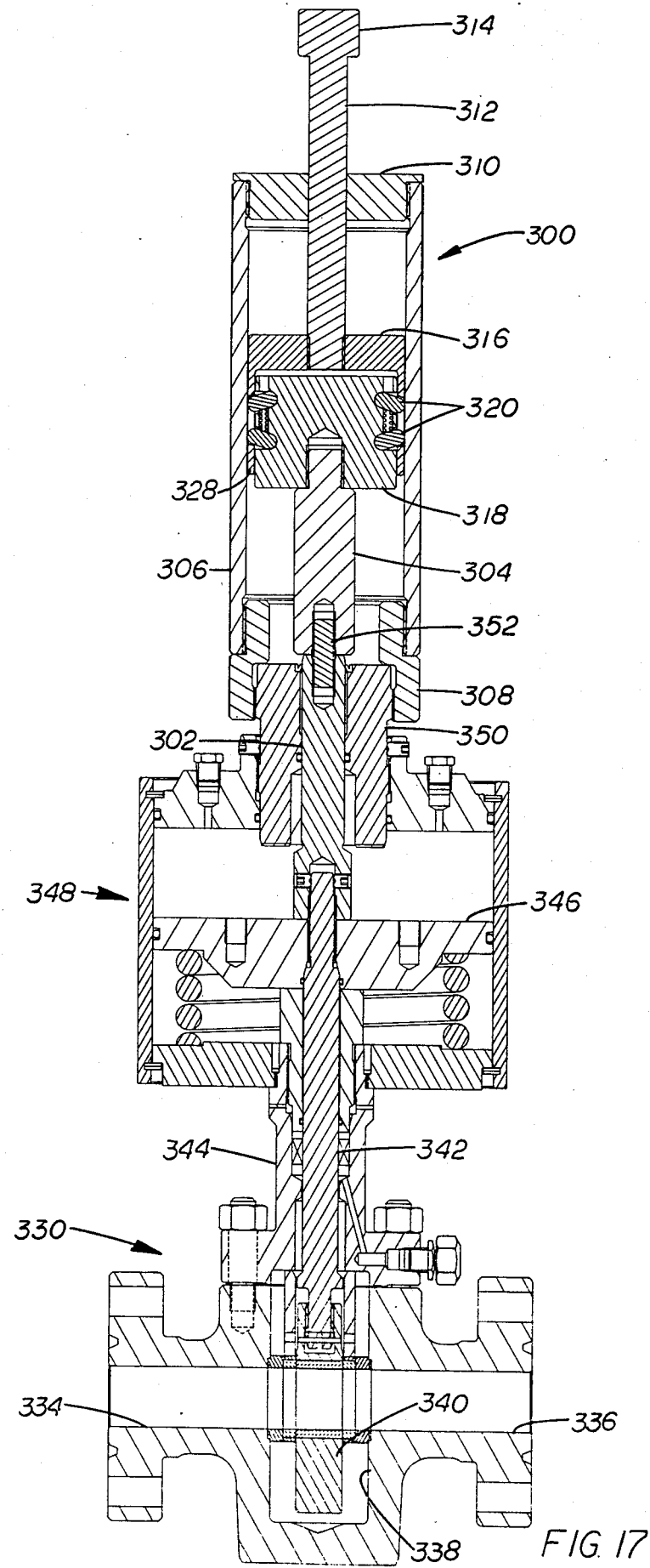
FIG. 17 is a longitudinal sectional view of a valve having the manual override mechanism shown in FIGS. 15 and 16 connected thereto.
Figure 18:
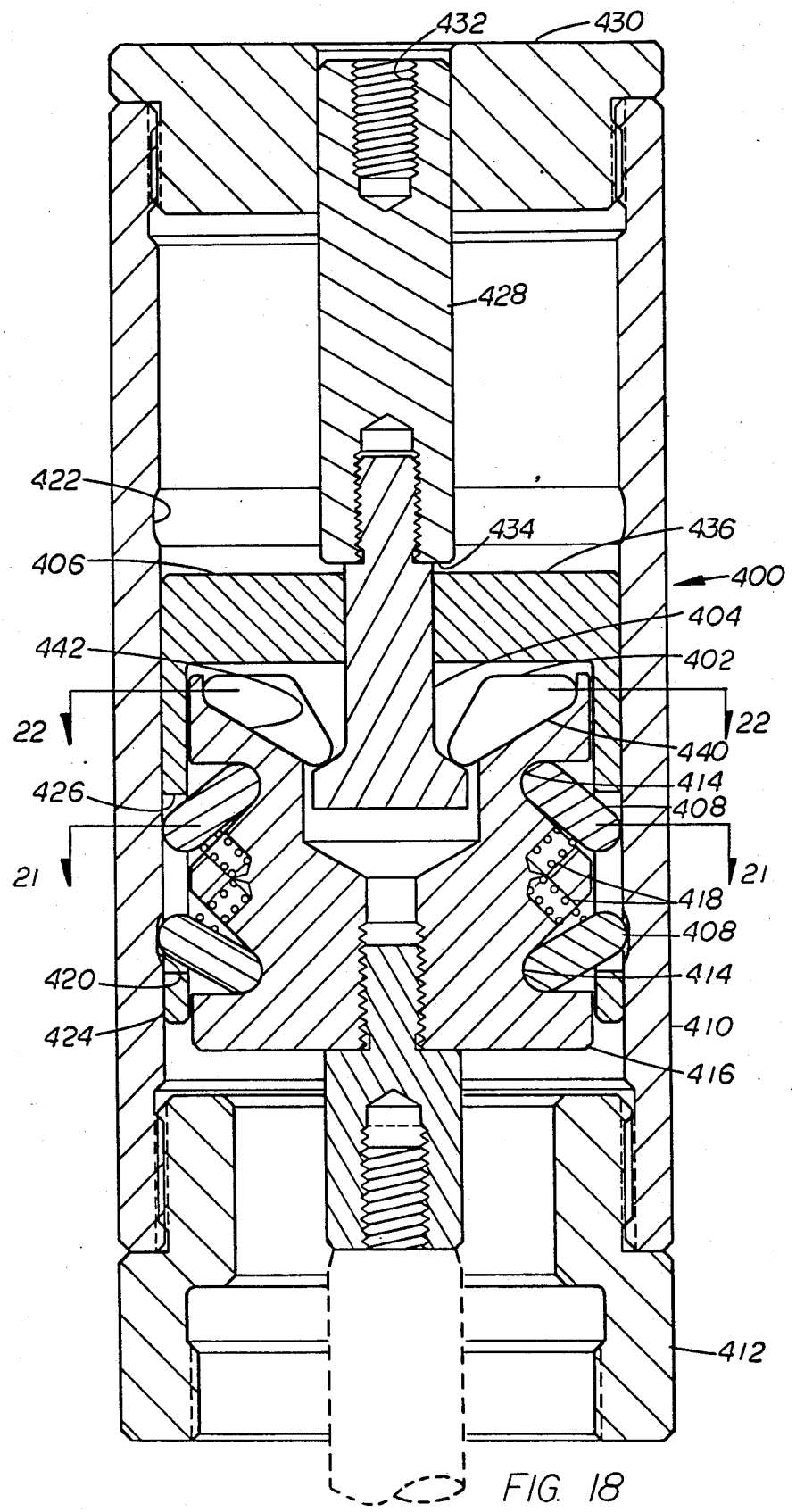
FIG. 18 is a detail longitudinal sectional view of a modified form of manual override mechanism having the valve stem in is down position and including camming elements which assist in the operation of the override mechanism.

Manual override mechanism 300 illustrated in FIGS. 15, 16 and 17 is similar to override mechanism 204 illustrated in FIGS. 10 through 12, except that it is connected directly to gate stem 302 by rod extender 304 and has housing 306 secured to the outer end of coupling 308. The outer end of housing 306 is closed by plug 310 which is threaded into the outer end of housing 306 as shown. Override stem 312 extends through plug 310 and is slidable therein. Stem 312 has an outer end 314 with a suitable 25 configuration for engagement by a suitable tool (not shown) so that it may be moved manually inward and outward with respect to housing 306. Stem 312 has its inner end connected to override drive cup 316 which is slidably mounted within housing 306 and which surrounds drive adapter 318 which is positioned within cup 316 with the drive paddles 320 providing the driving connection therebetween. Rod 304 is threaded into the inner end of drive adapter 318 and also is threaded into the outer end of gate stem 302. Paddles 320 are supported in recesses 322 on the exterior of drive adapter 318 with springs 324 between the outer and inner rows of paddles 320. Paddles 320 also extend through openings 326 in skirt 328 of cup 316. The ends of openings 326 engage either the outer or inner rows of paddles 320 to disengage the row of paddles 320 which prevents the desired movement, i.e., when stem 312 is moved outward, the lower row of paddles 320 are engaged by skirt 328 at the lower end of openings 326 and cause them to pivot upwardly at their outer ends so that they are disengaged from the interior of housing 306 allowing rod 304 and gate stem 302 to move outward in response to such manual movement of stem 312.

When stem 312 is moved inward, the upper row of paddles 320 are engaged by skirt 328 at the upper end of openings 326 and cause them to pivot downwardly at their outer ends so that they are disengaged from the interior of housing 306, allowing rod 304 and gate stem 302 to move inward in response to such manual movement of stem 312.

Valve 330 as shown in FIG. 17 includes body 332 having inlet 334, outlet 336 and valve chamber 338 therebetween with gate 340 mounted in valve chamber 338 to open and close flow through valve 330. Gate stem 342 is secured to gate 340 and extends through bonnet 344 into engagement with piston 346 of actuator 348. Actuator 348 is mounted on the outer end of bonnet 344 and includes sleeve 350 secured to its outer end with coupling 308 secured thereto for receiving housing 306. Rod extender 302 is suitably secured to the outer end of gate stem 342 and is secured at its outer end to connection rod 304 by threaded pin 352. In the event gate stem 342 does not extend through piston 346, rod extender 302 is secured at its inner end to piston 346.

From the above description it can be seen that the improved manual override mechanism 300 can be quickly attached to a valve and with suitable adjustments as hereinafter described may be used to manually operate the valve 330. It should be noted that the attachment of manual override mechanism 300 to valve 330 will resist movement of gate 340 by actuator 348 because paddles 320 will be in engagement with the interior of housing 306 and attempted movement of actuator 348 will only cause the row of paddles 320 resisting such movement to become more firmly engaged with the interior of housing 306. Their release is accomplished only by the movement of override stem 312 and cup 316 so that skirt 328 moves paddles 320 away from their engagement with the interior of housing 306.

Manual override mechanism 400 illustrated in FIGS. 18 through 22 is a modified form of mechanism in that it includes additional camming elements 402 together with a camming extension 404 which extends through drive cup 406 and ensures the proper movement of the paddles 408 during manual actuation of mechanism 400. Manual override mechanism 400 includes housing 410 which is secured to a coupling 412 which connects to the outer end of the valve actuator (not shown). In the form shown, it is to be connected in the same manner as the mechanism 300 shown in FIGS. 15 through 17 but it should be noted that it could be used with the mechanism illustrated in FIGS. 10 through 12 with proper connections.

Paddles 408 are positioned in recesses 414 in drive adapter 416 and springs 418 are provided in engagement with paddles 408 to urge the upper row of paddles 408 upwardly into engagement with the interior of housing 410 and to urge the lower row of paddles 408 downwardly into engagement with the interior of housing 410. Groove 420 is provided on the interior of housing 410 at a level for engagement by the lower row of paddles 408 when mechanism 400 is in its inward position and groove 422 is provided on the interior of housing 410 at a level for engagement by the upper rod of paddles 408 when mechanism 400 is in its outward position. Grooves 420 and 422 are provided to ensure that the rows of paddles 408 readily engage and maintain their engagement with the interior of housing 410 until they are positively released. Skirt 424 includes openings 426 through which paddles 408 extend and which engage paddles 408 for the release of their engagement with the interior of housing 410 as previously explained with reference to the other forms of the invention.

Override stem 428 slidably extends through plug 430 which is threaded into the outer end of housing 410. Stem 428 is secured to the outer end of camming extension 404 and is provided with internal threaded opening 432 in its outer end for receiving a suitable tool or extension for manual operation of mechanism 400. Override stem 428 has a larger diameter than camming extension 404 to provide inwardly facing shoulder 434 which engages the upper surface 436 of drive cup 406 during inward movement of the device so that skirt 424 engages and releases the upper row of paddles 408 to allow such movement.

Figure 19:
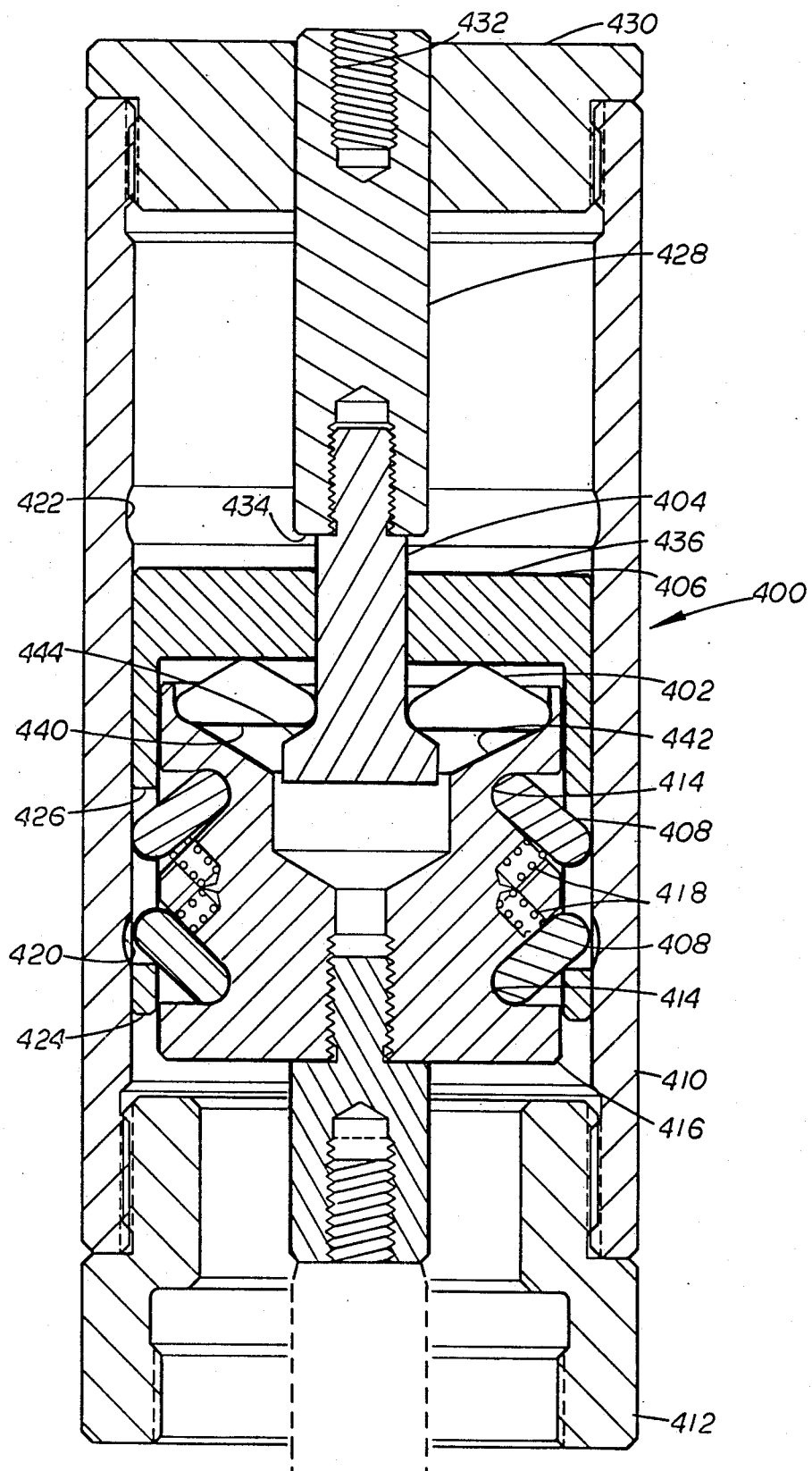
FIG. 19 is a sectional view similar to FIG. 18 but illustrating the initial movement of the override stem and the action of the camming elements.
Figure 20:
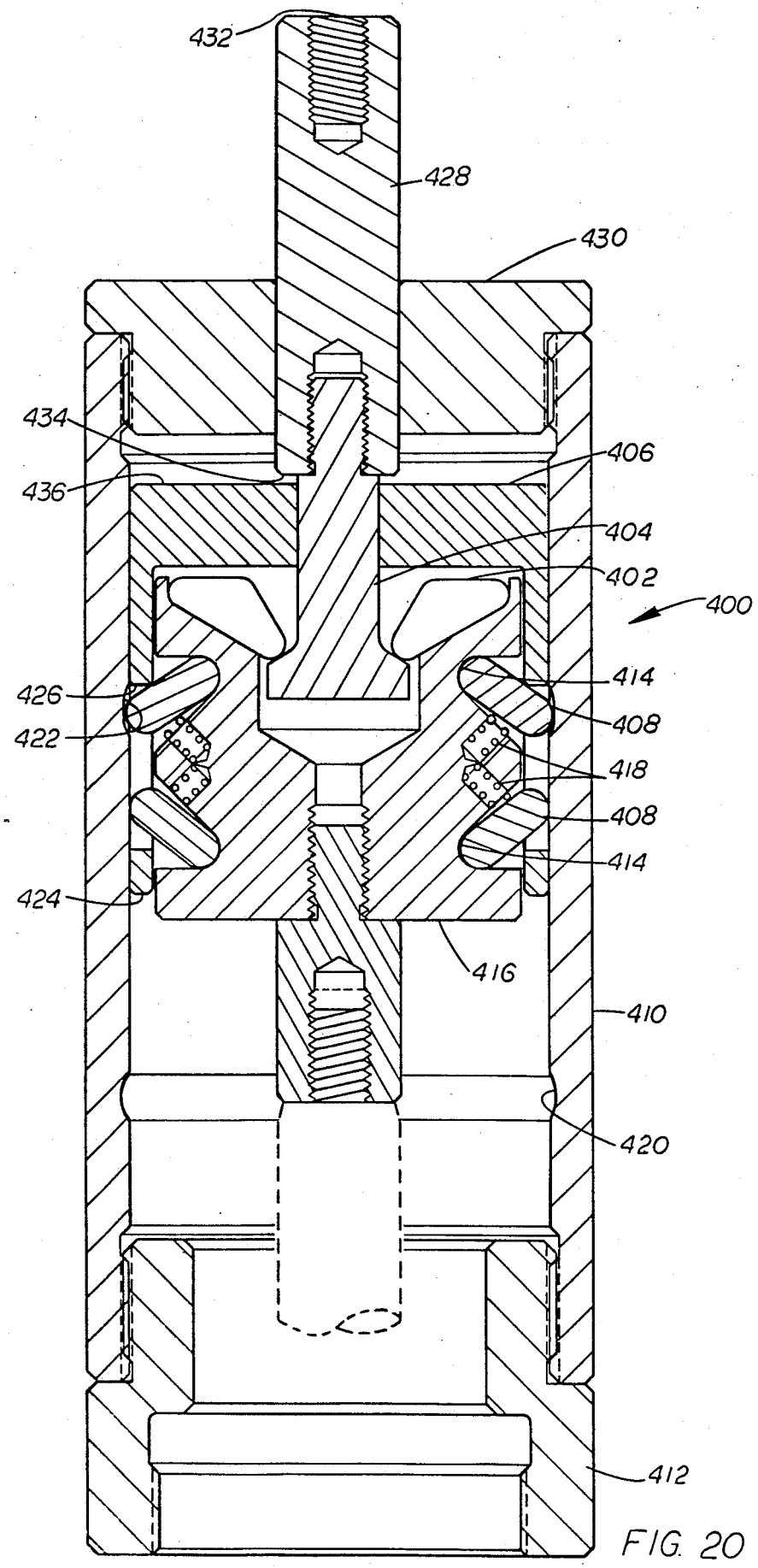
FIG. 20 is a sectional view similar to FIGS. 18 and 19 but showing the override mechanism and gate valve stem moved to its up position by the manual override mechanism.
Figure 22:
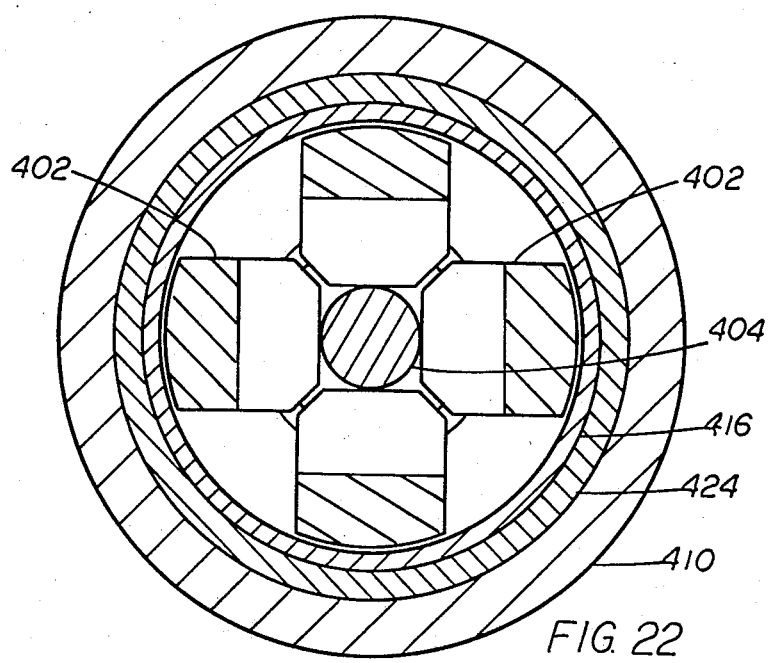
FIG. 22 is a transverse sectional view of the camming elements taken along line 22—22 in FIG. 18 and showing the camming elements of the override mechanism shown in FIGS. 15 through 20.
Figure 21:
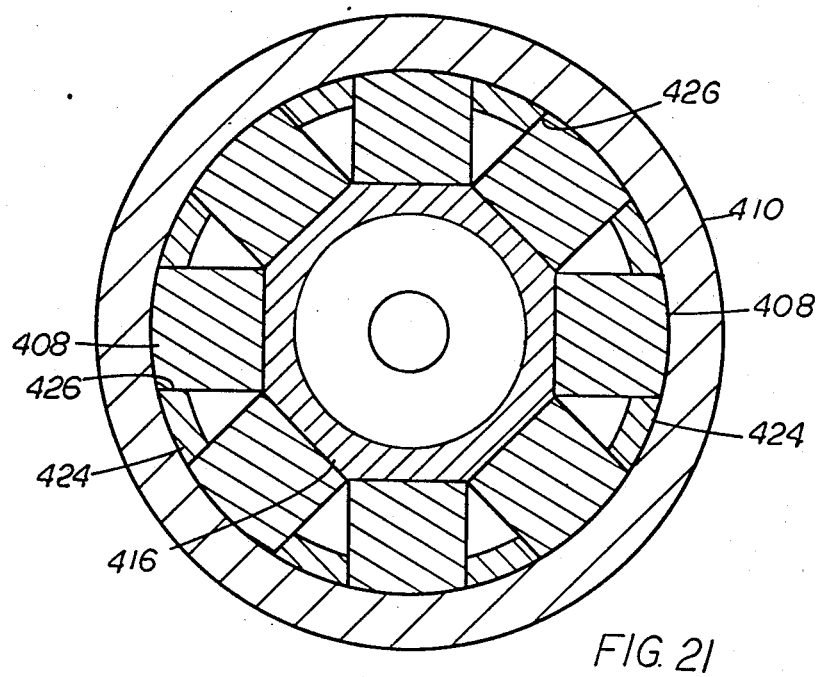
FIG. 21 is a transverse sectional view taken along line 21—21 in FIG. 18 and showing the drive elements of the override mechanism shown in FIGS. 15 through 20.

The action for outward movement of the device functions differently in that outward movement of stem 428 responsive to manual operation causes camming extension 404 to move outwardly through drive cup 406. As shown in the drawings, each of the camming elements 402 is triangular in shape and are positioned in surrounding relationship to stem 428 with their long side or hypotenuse 440 on the upper tapered surface 442 of adapter 416. As shown in FIG. 19, the upwardly facing shoulder 444 or the inner end of camming extension 404 engages the inner ends of camming elements 402 and further upward movement of stem 428 causes elements 402 to pivot with their inner ends moving upwardly so that their apex engages the lower side of drive cup 406 and their outer ends engage the upper surface 442 of drive adapter 416. This pivoting movement of camming elements 402 urges drive adapter 416 inward and drive cup 406 outward to ensure release of the lower row of paddles 408 from their engagement within lower groove 420 to allow the assembly to move outward and thus to move the valving element (not shown) to its outer position. The camming of elements 402 creates a substantial mechanical advantage in the movement of the manual override mechanism 400 to ensure that the desired movement of the gate or other valving element is achieved. The completion of this outward movement results in the position of the mechanism 400 as shown in FIG. 20 with the outer row of paddles 408 being in engagement with outer groove 422.

In the modified form of the invention which is adapted for direct connection of an extension of the actuator piston, it is noted that sufficient force should be available in the manual operation to overcome the spring return force of the actuator spring and also, any pressure fluid trapped in the actuator needs to be vented so that it does not prevent operation of the manual override mechanism.

What is claimed is:

1. A gate valve comprising
   a body having a gate chamber therein with an inlet and an outlet communicating therewith,
   a gate positioned within said gate chamber for reciprocation therein between positions opening and closing flow between the inlet and the outlet,
   a gate stem,
   a pressure responsive actuator having an actuator stem and providing movement of such actuator stem,
   said pressure responsive actuator including an engagement surface,
   a manual override stem, and
   a drive means connecting said gate stem to both of said actuator stem and said manual override stem for actuation of said gate,
   said drive means including an overrunning clutch connection being engageable with said engagement surface,
   said clutch connection being operated only by said manual override stem and being selectively moveable into and out of engagement with said engagement surface, and
   wherein movement of said gate responsive to movement of said manual override stem being independent of any position and any movement of said actuator and said actuator stem without having to overcome the pressure loading of the actuator.

2. A gate valve according to claim 1 wherein
   the movements of said gate stem, said actuator stem and said manual override stem are axial movements.

3. A gate valve according to claim 1 wherein
   the movements of said gate stem, said actuator stem and said manual override stem are rotary movements.

4. A gate valve according to claim 1 wherein said overrunning clutch connection includes
   a plurality of paddles positioned between said actuator stem and said gate stem to provide engagement and movement together of said stem during normal operations, and
   a follower sleeve for engaging the ones of said paddles providing the transmission of movement of the manual override stem to said actuator stem during closing movement of the manual override stem and during the opening movement of said manual override stem.

5. A gate valve comprising
   a body having a gate chamber therein with an inlet and an outlet communicating therewith,
   a gate positioned within said gate chamber for reciprocation therein between positions opening and closing flow between the inlet and the outlet,
   a gate stem,
   means interposed between the gate stem and the gate to convert the rotary motion of the gate stem to axial movement of the gate,
   a pressure responsive actuator having an actuator stem and providing rotation of such actuator stem,
   said pressure responsive actuator including an engagement surface,
   a manual override stem, and
   a drive means connecting said gate stem to both of said actuator stem and said manual override stem for actuation of said gate,
   said drive means including an overrunning clutch connection being engageable with said engagement surface,
   said clutch connection being operated only by said manual override stem and, being selectively moveable into and out of engagement with said engagement surface, and
   wherein movement of said gate responsive to rotation of said manual override stem being independent of any position and any movement of said actuator and said actuator stem without having to overcome the pressure loading of the actuator.

6. A gate valve according to claim 5 wherein said drive means includes
   an annular sleeve,
   means connecting the annular sleeve to the manual override stem for rotation therewith, and
   a plurality of paddles for providing engagement between the actuator stem and the manual override stem,
   manual rotation of said manual override stem resulting in engagement of the paddles providing engagement with the actuator stem to move the paddles out of such engagement to allow movement of the gate stem directly by the manual override stem.

7. An override apparatus for actuating a gate valve, said gate valve having a body with passages therethrough, a valve member, a pressure responsive actuator having an engagement surface and connected by a valve stem to move the gate valve between positions opening and closing flow through said body passages, said override apparatus comprising:
   a manual override stem,
   drive means connecting said override stem to said valve member,
   said drive means including an overrunning clutch connection being engageable with said engagement surface,
   said clutch connection being operated only by said manual override stem and being selectively moveable into and out of engagement with said engagement surface and
   wherein movement of said valve member responsive to movement of said manual override stem being independent of any position and any movement of said actuator without having to overcome the pressure loading of the actuator.

8. An override apparatus according to claim 7 including
   a housing in which said override apparatus is mounted, and
   means for connecting said housing to the gate valve.

9. An override apparatus according to claim 8 wherein the gate valve includes an actuator and wherein said drive means includes
- means connecting said override stem to the gate valve actuator whereby movement of said override stem moves said actuator and said valve member.

10. An override apparatus according to claim 8 wherein said overrunning clutch includes
- a drive cup connected to said manual override stem and having a skirt with radial opening therethrough
- a drive adapter positioned within said drive cup skirt, connected to said valve member and having an inner and an outer row of recesses,
- an inner row of paddles mounted in said drive adapter,
- an outer row of paddles mounted in said drive adapter, and
- means biasing said paddles outwardly into engagement with the interior of said housing through said drive cup openings.

11. An override apparatus according to claim 8 wherein said housing includes
- an inner annular internal groove to be engaged by said inner row of paddles of said overrunning clutch to secure said overrunning clutch in its innermost position, and
- an outer annular internal groove to be engaged by said outer row of paddles of said overrunning clutch to secure said overrunning clutch in its outermost position.

* * * * *